(12) United States Patent
Sigal

(10) Patent No.: US 12,609,532 B1
(45) Date of Patent: Apr. 21, 2026

(54) PORTABLE SYNCHRONOUS CONDENSER APPARATUS UTILIZING A DC MOTOR, PORTABLE SYNCHRONOUS CONDENSER SYSTEM, METHOD OF OPERATION, AND METHOD OF MANUFACTURE

(71) Applicant: Vincent Pearce Sigal, Windsor, CA (US)

(72) Inventor: Vincent Pearce Sigal, Windsor, CA (US)

( * ) Notice: Subject to any disclaimer, the term of this patent is extended or adjusted under 35 U.S.C. 154(b) by 0 days.

(21) Appl. No.: 19/280,479

(22) Filed: Jul. 25, 2025

(51) Int. Cl.
| | |
|---|---|
| *H02J 3/18* | (2006.01) |
| *H02J 3/1885* | (2026.01) |
| *H02J 3/40* | (2006.01) |
| *H02K 7/18* | (2006.01) |

(52) U.S. Cl.
CPC .............. *H02J 3/1885* (2013.01); *H02J 3/40* (2013.01); *H02K 7/18* (2013.01); *H02J 2207/10* (2020.01)

(58) Field of Classification Search
CPC .... H02J 3/1885; H02J 3/40; H02J 3/44; H02J 2207/10; H02K 7/18
See application file for complete search history.

(56) References Cited

U.S. PATENT DOCUMENTS

| | | | | |
|---|---|---|---|---|
| 4,136,432 A | * | 1/1979 | Melley, Jr. ................ | B60P 3/00 29/469 |
| 6,140,803 A | | 10/2000 | Hurley | |
| 6,833,636 B1 | | 12/2004 | Nestel | |

| | | | | |
|---|---|---|---|---|
| 6,877,581 B2 | * | 4/2005 | Badr ......................... | B60P 3/00 280/789 |
| 7,498,770 B1 | | 3/2009 | Caldwell, II | |
| 8,384,319 B2 | * | 2/2013 | Marken ..................... | H02J 3/30 318/130 |
| 10,840,735 B1 | | 11/2020 | Cooper | |
| 11,571,982 B1 | * | 2/2023 | Tyne ...................... | B60L 53/11 |
| 11,852,687 B2 | * | 12/2023 | Tyne ................... | G01R 31/343 |
| 12,199,443 B2 | * | 1/2025 | Wu ........................... | H02J 3/28 |

(Continued)

FOREIGN PATENT DOCUMENTS

| | | | | |
|---|---|---|---|---|
| CN | 201332276 | Y | * | 10/2009 |
| CN | 102044879 | A | * | 5/2011 |

(Continued)

OTHER PUBLICATIONS

Machine translation CN-102044879-A (Year: 2011).*

(Continued)

*Primary Examiner* — Thienvu V Tran
*Assistant Examiner* — Yahveh Comas Torres
(74) *Attorney, Agent, or Firm* — Esplin & Associates, PC

(57) ABSTRACT

This disclosure presents a portable synchronous condenser apparatus, system, method of operating, and method of manufacture. A portable synchronous condenser apparatus may comprise one or more of a synchronous condenser, a mobile platform, a direct current (DC) motor, a battery bank, processor(s), and/or components. The processor(s) may be configured by machine-readable instructions to cause the direct current motor to activate based on power supplied by the battery bank; detect whether the rotor is at an operating speed; in response to detecting the rotor is at the operating speed, deactivate the direct current motor; control an operation of the synchronous condenser based on operation of a set of power generators; and/or perform other operations.

20 Claims, 4 Drawing Sheets

(56) References Cited

U.S. PATENT DOCUMENTS

| | | | |
|---|---|---|---|
| 2003/0122360 A1* | 7/2003 | Badr | B60P 3/00 |
| | | | 280/789 |
| 2005/0134248 A1 | 6/2005 | Locker | |
| 2008/0034256 A1 | 2/2008 | Mosman | |
| 2011/0267013 A1* | 11/2011 | Marken | H02J 3/30 |
| | | | 323/204 |
| 2012/0078578 A1 | 3/2012 | Piccirillo | |
| 2012/0248874 A1 | 10/2012 | Pan | |
| 2012/0306458 A1 | 12/2012 | Fogarty | |
| 2014/0312711 A1 | 10/2014 | Warlick | |
| 2015/0168981 A1 | 6/2015 | Skliutas | |
| 2015/0222121 A1 | 8/2015 | Kuttel | |
| 2015/0300321 A1* | 10/2015 | Haar | F03D 9/255 |
| | | | 206/223 |
| 2015/0372491 A1 | 12/2015 | Spisak | |
| 2017/0133847 A1 | 5/2017 | Brown | |
| 2017/0315184 A1 | 11/2017 | Morin | |
| 2017/0335824 A1 | 11/2017 | Gupta | |
| 2017/0370993 A1 | 12/2017 | Weinberg | |
| 2018/0013318 A1 | 1/2018 | Nguyen | |
| 2018/0212430 A1 | 7/2018 | Chung | |
| 2018/0312051 A1* | 11/2018 | Hodowanec | B60K 6/36 |
| 2019/0283499 A1 | 9/2019 | Bodill | |
| 2020/0125084 A1 | 4/2020 | Harder | |
| 2021/0190873 A1 | 6/2021 | Jadwinski | |
| 2021/0376613 A1* | 12/2021 | Cummings | H02J 7/007 |
| 2023/0041412 A1 | 2/2023 | Kohn | |
| 2023/0082105 A1 | 3/2023 | Pranith | |
| 2023/0283144 A1 | 9/2023 | Skliutas | |
| 2023/0370017 A1* | 11/2023 | Ginsberg-Klemmt | |
| | | | H02S 40/38 |
| 2023/0378766 A1 | 11/2023 | Yin | |
| 2024/0421602 A1* | 12/2024 | Wu | H02J 3/46 |
| 2025/0031338 A1 | 1/2025 | Sigal | |

FOREIGN PATENT DOCUMENTS

| | | | | | |
|---|---|---|---|---|---|
| CN | 201994672 | U | * | 9/2011 | |
| CN | 102292532 | A | * | 12/2011 | F01N 13/04 |
| CN | 103472325 | | | 12/2013 | |
| RU | 2262790 | C1 | * | 10/2005 | |

| | | | | |
|---|---|---|---|---|
| WO | 2022132807 | | 6/2022 | |
| WO | WO-2023104264 | A1 * | 6/2023 | H02J 3/001 |
| WO | WO-2025014585 | A2 * | 1/2025 | H02J 7/35 |

OTHER PUBLICATIONS

Machine Translation CN-201994672-U (Year: 2011).*
Machine Translation CN_201332276_Y_ (Year: 2009).*
Machine Translation CN-102292532-A (Year: 2011).*
Machine Translation RU-2262790-C1 (Year: 2005).*
Eaton, "Power Factor Correction: A Guide for the Plant Engineer"; Technical Data SA02607001E; Aug. 2014; (1-3).
Brian Tienhaara, "Generator Load Testing"; American Generators; Apr. 2015; (1-3).
David Jesberger, "SIGMA Control—The Most Advanced Load Bank Control Solution";ASCO Power Technologies; Jun. 2020; (1-25).
Damien Olsen, "How To Avoid Wet Stacking In Your Diesel Generator"; Energy Management Corporation;Oct. 2020; (1-2).
John Ware, "Power factor correction"; IEE Wiring Matters; Spring, 2006; (1-3).
Rx Monitoring Services, "Intelligent Load Bank"; User Manual; Sep. 2020; (1-38).
Neil Rasmussen, "Impact of Leading Power Factor on Data Center Generator Systems"; Schneider Electric White Papers 200; Nov. 2015; (1-19).
Andrea, "Maintenance For Portable Generators: Ultimate Guide"; Electric Baron; Dec. 2020; (1-30).
APR Energy, "APR Energy's Mobile Turbine Generator Configured as Synchronous Condenser" White paper, Mar. 2020, 13 pgs., (Year: 2020).
Nguyen et al., "Distributed Secondary Control in Microgrids Using Synchronous Condenser for Voltage and Frequency Support" Energies 2022, 15, 2968, 16 pgs. (Year: 2022).
TPC Team, "What is Mobile Statcom?" Aug. 15, 2023. accessed at https://www.tpcwire.com/blog/what-is-mobile-statcom 6 pg. print out (Year: 2023).
Wang et al., "Research and Application of J1939 Protocol in Engine Parameter Monitoring System" 2020 IEEE 5th Information Technology and Mechatronics Engineering Conference (ITOEC 2020), pp. 1532-1535 (Year: 2020).

* cited by examiner

100

101

Mobile Platform 102

Processor(s) 104

Machine-Readable Instructions 106

Comm. Component 108

State Component 110

Control Component 112

118

Sync. Condenser 120

122

124

126

128

DC Motor 129

Battery Bank 119

170

Power Generating System(s) 130

132

134

136

External Resource(s) 150

Network(s) 160

Computing Platform(s) 140

PORTABLE SYNCHRONOUS CONDENSER APPARATUS UTILIZING A DC MOTOR, PORTABLE SYNCHRONOUS CONDENSER SYSTEM, METHOD OF OPERATION, AND METHOD OF MANUFACTURE

FIELD

This disclosure relates generally to synchronous condensers, methods for operation of synchronous condensers, and methods of manufacture thereof.

BACKGROUND

Temporary power generation installations may comprise one or more of generators, switchgear, load banks, transformers, cabling to connect the various components, and/or other elements. These installations can range in size from 500 kW to 50 MW in size. The larger the installation, multiple generators (such as those that are diesel fueled) may be connected in parallel to emulate and function as a microgrid.

Synchronous condensers are components in modern electrical power grids used for regulating voltage and maintaining grid stability. The main components of a synchronous condenser are a stator, a rotor, and an excitation system. The stator creates a rotating magnetic field through stator winding. The rotor rotates at synchronous speed and interacts with the stator to supply or absorb reactive power by generating its own magnetic field using direct current (DC) supplied by the excitation system. A synchronous condenser typically utilizes a low-voltage induction motor (e.g., AC electric motor) to start rotation, referred to as a "pony motor."

Synchronous condensers are deployed in large-scale, permanently installed power generating systems such as thermal power plants, hydropower stations, and renewable energy installations like wind and solar farms. They are also commonly found in substations or industrial grids, where they can provide the necessary support to prevent voltage fluctuations and maintain the overall health of the grid.

SUMMARY

In some power generating systems (such as microgrids), due to individual generators working in unison with each other via analog or digital communication to deliver power to the consumer, the power being consumed by the end consumer may affect the performance of the individual generators and/or the quality of power being delivered. Charging of electric vehicles, HVAC usage, industrial motor loads, and/or other loads may affect the ability of individual generators to deliver clean power with a power factor close to unity. Changes in power consumption may produce undesirable effects on the power generators, such as reactive and capacitive inductance, leading to less than efficient energy being delivered by the generators to the consumer. The larger the reactance, the higher the possibility that generators will trip offline due to winding temperature increasing or reverse power (motoring). Traditionally, to offset these undesirable power quality effects, reactive load banks or capacitor banks are used to absorb or inject reactance. However, these components do not contribute to the alleviation of fault duty and/or short circuit interruption.

The primary function of a synchronous condenser is to either absorb or provide reactive power, ensuring that voltage levels remain within a necessary operating range. Reactive power refers to the power not consumed by a load, but stored in inductive or capacitive components within a circuit, causing the current to fluctuate out of phase with the voltage. Reactive power may be measured in volt-amperes reactive ("VAR").

Reactive power is vital for maintaining voltage levels in the grid and supports the efficient transmission of electrical power. A synchronous condenser supplies reactive power in situations where there is a deficit of reactive power, typically caused by low voltage or increased inductive demand. A synchronous condenser absorbs reactive power in situations where there is a surplus/excess of reactive power or when the grid is experiencing voltage instability due to leading reactive power conditions.

In terms of "power factor," a synchronous condenser operates by adjusting its field excitation to either generate or absorb reactive power, effectively allowing it to control the power factor of an electrical system. Power factor is a measure of how efficiently electrical power is being used in a circuit, expressed as the ratio of "real power" (the power that actually does work) to "apparent power" (the total power draw). A synchronous condenser balances the power factor by either supplying a leading current that partially neutralizes a lagging reactive power drawn by a load or absorbing reactive power to correct a leading power factor, thereby improving the overall power factor.

Synchronous condensers are fixed structures at the locations where they are deployed. Synchronous condensers may weigh several hundred tons, and operate in a range of 20 MVAR-350 MVAR (megavolt-amps reactive). Once installed, synchronous condensers remain at their designated location for the duration of their operational life. The rotating machinery and electrical connections are permanently fixed to the site, and the system is integrated into the infrastructure.

The permanent, fixed, and large nature of synchronous condensers makes them unusable in some scenarios. For example, when power generating systems themselves are not permanent and/or fixed (e.g., temporarily constructed microgrids for temporary power generation), the logistical effort to deploy synchronous condensers is generally considered infeasible. Moreover, for power generating systems having relatively low output capacity (compared to full-scale systems), the deployment of a cumbersome synchronous condenser is also generally not a consideration. Making a synchronous condenser portable has many advantages, including allowing it to be usable with permanent or non-permanent power generating systems (e.g., temporary power generation setups), such as those with relatively lower output capacity.

The behavior of a synchronous condenser is typically controlled based on an overall system's voltage, reactive power requirements, and/or other measures. The inventor of the present disclosure has identified that establishing communication between a synchronous condenser and individual power generators in a set of power generators making up a power generating system (e.g., set of diesel or gas generators, set of wind turbines, etc.) may be advantageous. Since each power generator may have its own electronic control unit (ECU), direct communication channels between one or more of the power generators and the synchronous condenser may be established. By the integration of the synchronous condenser as a participant on a common bus of one or more power generators, effective communication and reactive power regulation may be achieved. By providing a synchronous condenser with information about the state of power production at individual power generators, as opposed to solely a total power production sent to a distribution circuit (e.g., network of electrical lines and/or equipment that delivers electricity to end consumers), the synchronous condenser may not only stabilize the system as a whole, but also absorb and/or supply reactive load for individual power generators.

Rotation of a rotor of a synchronous condenser is typically initiated with a low-voltage induction motor (e.g., AC electric motor) and a variable speed drive (VSD), referred to as a "pony motor." Power to the pony motor is provided through electronical connection to the power grid and/or power generators supplying power to the grid. If the power generators and/or grid go down, there may be no power to operate the pony motor, thus rendering a synchronous condenser inoperable.

One or more implementations of the present disclosure propose a portable synchronous condenser apparatus. The portable synchronous condenser apparatus may comprise one or more of a synchronous condenser, one or more processors, a direct current (DC) motor, a battery bank, and/or other components. One or more components of the apparatus may be sized and/or dimensioned to be carried by a mobile platform. The DC motor may be mechanically coupled to a rotor of the synchronous condenser. By way of non-limiting illustration, an output shaft of the DC motor may be mechanically coupled to an input shaft of the rotor. The DC motor may be configured to rotate the rotor to an operating speed. The DC motor may be carried by the mobile platform. The battery bank may be electrically coupled to the DC motor. The battery bank may be configured to supply power to the DC motor. The battery bank may be carried by the mobile platform.

The one or more processors may be configured by machine-readable instructions. Executing the machine-readable instructions may cause the one or more processors to facilitate control of the synchronous condenser. The machine-readable instructions may include one or more computer program components.

A computer program component may be configured to cause the DC motor to activate (e.g., power on) based on power supplied to the DC motor by the battery bank. Activation of the DC motor may cause initial and/or ongoing (over a period of time) rotation of the rotor of the synchronous condenser. Activation may be accomplished by controlling a motor control circuit (e.g., microcontroller and/or other logic circuits) of the DC motor to apply a voltage (and/or current) across motor terminals.

A computer program component may be configured to detect whether the rotor of the synchronous condenser is at and/or near the operating speed. The detections may be based on a sampling rate of rotational speed of the rotor and/or DC motor. The sampling rate may be one or more of intermittent (e.g., every second), ongoing (e.g., continuous, continuous over a period of time, and/or other considerations), quasi-continuous, and/or other rates.

A computer program component may be configured to, in response to detecting the rotor is at the operating speed, deactivate the DC motor (e.g., power off).

A computer program component may be configured to control an operation of the synchronous condenser based on operation of the set of power generators. Control of the operation of the synchronous condenser may be effectuated once the synchronous condenser is at the operating speed.

One or more implementations of the present disclosure propose a portable synchronous condenser system. The portable synchronous condenser system may comprise one or more of a mobile platform, a synchronous condenser, one or more processors, a DC motor, a battery bank, and/or other components. One or more of the synchronous condenser, the DC motor, the battery bank, the one or more physical processors, and/or other components of the system may be carried by the mobile platform. The synchronous condenser may be configured to be electrically coupled to a power generating system including a set of power generators. The DC motor may be mechanically coupled to a rotor of the synchronous condenser. The DC motor may be configured to rotate the rotor to an operating speed. The battery bank may be electrically coupled to the direct current motor. The battery bank may be configured to supply power to the direct current motor.

One or more implementations of the present disclosure propose a synchronous condenser system. The portable synchronous condenser system may comprise one or more of a set of diesel generators configured to supply power, a synchronous condenser, one or more processors, a DC motor, a battery bank, and/or other components. The synchronous condenser may be configured to be electrically coupled to the set of diesel generators. The DC motor may be mechanically coupled to a rotor of the synchronous condenser. The DC motor may be configured to rotate the rotor to an operating speed. The battery bank may be electrically coupled to the direct current motor. The battery bank may be configured to supply power to the direct current motor.

As used herein, any association (or relation, or reflection, or indication, or correspondence) involving processor(s), synchronous condenser(s), and/or another entity or object that interacts with any part of the system and/or plays a part in the operation of the system, may be a one-to-one association, a one-to-many association, a many-to-one association, and/or a many-to-many association, or an N-to-M association (note that N and M may be different numbers greater than 1). As used herein, the phrase "configured to" is intended to be interpreted broadly, as "being capable of or suitable for performing" some function or feature, without requiring any adaptations to provide said function or feature.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
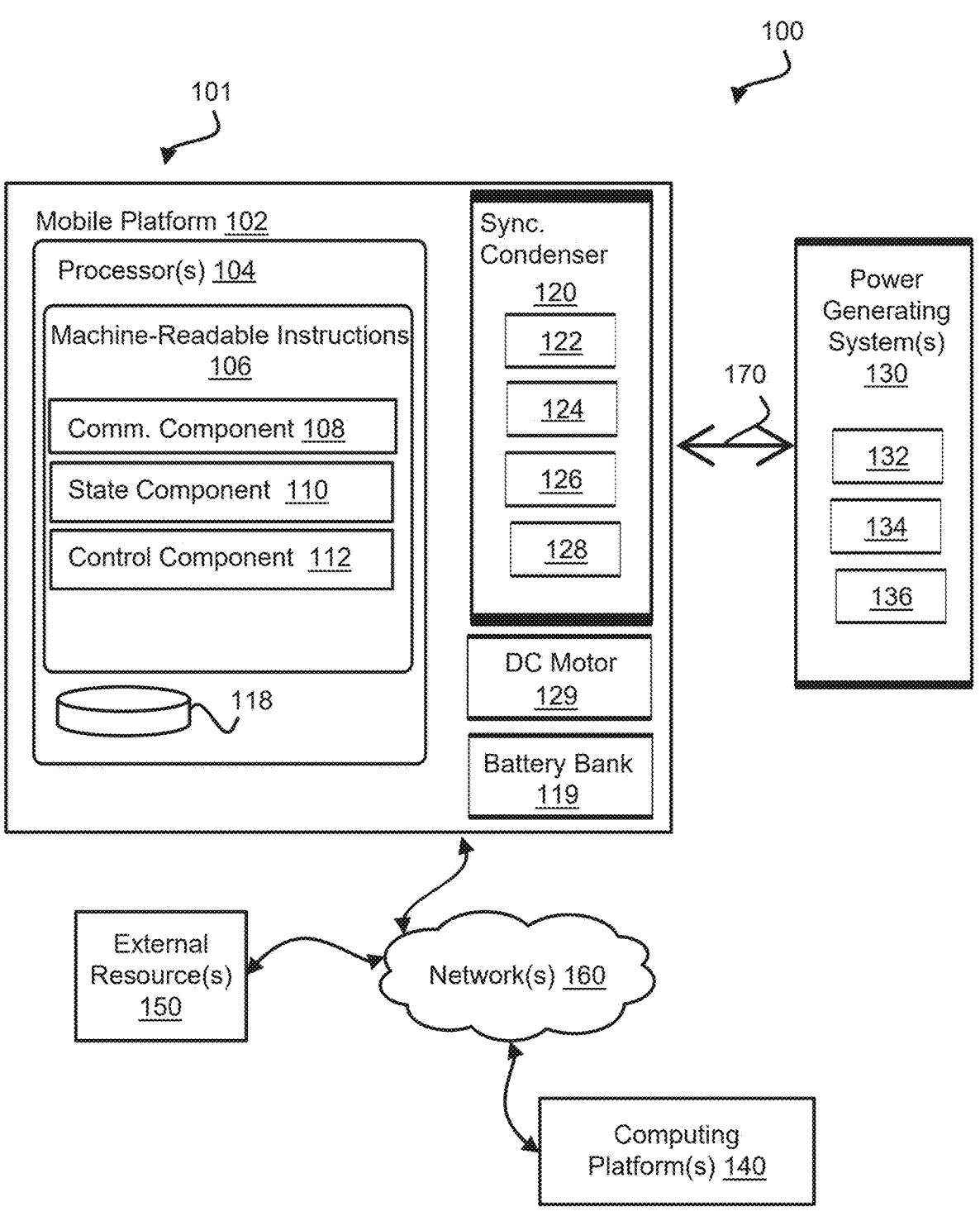
FIG. 1 illustrates a portable synchronous condenser system, in accordance with one or more implementations.

FIG. 1 illustrates a portable synchronous condenser system 100, in accordance with one or more implementations. The system 100 may include one or more of a mobile platform 102, processor(s) 104, synchronous condenser 120, direct current (DC) motor 129, a battery bank 119, power generating system(s) 130, computing platform(s) 140, external resource(s) 150, and/or other components.

Mobile platform 102 in FIG. 1 may comprise a specially constructed mobile platform and/or a mobile platform adapted and/or configured for the features and/or functions described herein. The mobile platform 102 may include one or more components upon which equipment may be mounted, removably and/or non-removably. The mobile platform 102 may include one or more of a vehicle, a container, and/or other components. The mobile platform 102 carrying one or more of processor(s) 104, non-transitory electronic storage 118, synchronous condenser 120, and/or other components may define a portable synchronous condenser apparatus 101 of the present disclosure.

A vehicle may comprise one or more of a truck, a train, a boat, and/or other vehicle. A container may comprise an ISO container (commonly referred to as a "shipping container") and/or other container. A container may include a specially constructed container that is sized and/or dimensioned for the features and/or functions presented herein.

A container may be a fully or partially enclosed structure, and may be made of a material such as metal. The container may be a rectangular container. By way of non-limiting illustration, a container may be a twenty (20) foot container with a height of 7.9 feet or 2.39 meters, a width of 7.8 feet or 2.35 meters, and a length of 19.4 feet or 5.9 meters. In some implementations, a container may be a standard shipping container. Since shipping containers are generally recognized as standardized, the use of a shipping container may allow the portable synchronous condenser apparatus 101 to be easily transported to a desired location using common transportation means, such as container ships, freight trains, and/or semi-trucks.

Mobile platform 102 may include (e.g., via permanent and/or removable mounting) one or more of processor(s) 104, non-transitory electronic storage 118, synchronous condenser 120, and/or other components. Components may be carried by mobile platform 102 through one or more mounting components and/or techniques. By way of non-limiting illustration, mounting may be accomplished by riveting, screwing, welding, strapping, and/or other techniques. The processor(s) 104 and/or electronic storage 118 may generally comprise a computer or computer system of portable synchronous condenser apparatus 101, through which at least some of the operation of synchronous condenser 120 may be controlled.

Synchronous condenser 120 may include one or more of a stator 122, a rotor 124, an excitation system 126, digital voltage regulator (DVR) 128, and/or other components necessary for the operation of a synchronous condenser. Other components not shown in FIG. 1 may include one or more of a cooling system, one or more busses, a speed sensor, a rotor position sensor, and/or other components.

The DC motor 129 may be mechanically coupled to the rotor 124 of the synchronous condenser 120. The DC motor 129 may be configured to rotate the rotor 124 to an operating speed. The DC motor 129 may comprise a motor control circuit (not shown in FIG. 1) and/or other components. The motor control circuit may control direction and/or speed of rotation. The motor control circuit may include one or more of an H-bridge circuit for direction control, PWM (Pulse Width Modulation) for speed control, and/or other control mechanisms.

The DC motor 129 may comprise an output shaft that transmits mechanical power from the motor. The output shaft may be mechanically coupled to the rotor 124 of the synchronous condenser 120. The coupling may be accomplished through one or more physical couplings. Physical couplings may include one or more of rigid couplings, flexible couplings (e.g., jaw, diaphragm, and/or grid couplings), gear couplings, and/or other components.

The battery bank 119 may comprise an energy storage system designed to support power demands of DC motor 129. The battery bank 119 may include one or more batteries, one or more battery chargers, and/or other components. Batteries may include one or more of lithium-ion batteries, lead-acid batteries, nickel-cadmium batteries, and/or other battery compositions. Batteries may be connected in series or parallel configurations to achieve a desired voltage and/or storage capacity. Individual batteries and/or sets of batteries may be housed in modules mounted on racks, and/or configured in other ways. In some implementations, battery bank 119 may include one or more climate-controlled enclosures (not shown) to maintain safety and/or performance. The battery bank 119 may be specifically configured to support a total storage capacity needed for DC motor 129.

In some implementations, battery bank 119 may include a Battery Management System (BMS) and/or a dedicated charge controller configured to monitor, control, and/or protect battery bank 119 during discharge and/or charge. Monitoring and/or regulating the flow of current and/or voltage into the batteries may prevent overcharging, under-charging, and/or overheating.

In some implementations, battery bank 119 may be electrically coupled to power generating system(s) 130 to support charging.

The synchronous condenser 120 may comprise a conventional synchronous condenser configured to be mounted on a mobile platform. In some implementations, synchronous condenser 120 may comprise a synchronous condenser that is specially adapted and/or constructed to have specifications, dimensions, and/or other attributes that are specially configured for mounting on a mobile platform.

The synchronous condenser 120 may be carried by mobile platform 102. In some implementations, synchronous condenser 120 may be mounted onto a floor of a container within an internal space of the container.

The DC motor 129 and/or battery bank 119 may be carried by mobile platform 102. In some implementations, DC motor 129 and/or battery bank 119 may be mounted onto a floor of a container within an internal space of the container.

In some implementations, synchronous condenser 120 may be specifically sized and/or constructed to provide a reactive power capacity in the range of 1 MVAR-5 MVAR and/or other ranges. In some implementations, synchronous condenser 120 may be specifically sized and/or constructed to provide a reactive power capacity in the range of 1 MVAR-20 MVAR. In some implementations, synchronous condenser 120 may be specifically sized and/or constructed to provide a reactive power capacity in the range of 5 MVAR-10 MVAR. In some implementations, synchronous condenser 120 may be specifically sized and/or constructed to provide a reactive power capacity in the range of 2 MVAR-5 MVAR. In some implementations, synchronous condenser 120 may be specifically sized and/or constructed to provide a reactive power capacity in the range of 20 MVAR-350 MVAR. DC motor 129 and/or battery bank 119 may be sized and/or otherwise configured to support the operating requirements of the synchronous condenser 120.

In some implementations, portable synchronous condenser apparatus 101 may include one or more of specially constructed circuitry, connectors, a power panel, control panel, and/or other components (not shown in FIG. 1) configured to facilitate electrical connection and/or communication to power generating system(s) 130. By way of non-limiting illustration, portable synchronous condenser apparatus 101 may include a power panel (not shown in FIG. 1) through which electrical coupling(s) 170 to the power generating system(s) 130 may be achieved. Although not shown, the portable synchronous condenser apparatus 101 and power generating system(s) 130 (and/or distribution circuit) may be connected to a common bus (or busses).

In some implementations, a power panel (e.g., a cam-lock panel) may be mounted on or in mobile platform 102. The power panel may include one or more connectors for electrical cable connections. The electrical coupling(s) 170 may represent a set of electrical couplings (a set of cables) from the synchronous condenser 120 to individual power generators in a set of power generators of power generating system(s) 130. The electrical coupling(s) 170 may include an electrical coupling from battery bank 119 to one or more power generators in a set of power generators of power generating system(s) 130. In some implementations, synchronous condenser apparatus 101 may be connected in parallel with one or more of individual power generators of the power generating system (s) 130, switchgear, transformers, and/or other components.

A control panel (not shown in FIG. 1) may be electrically connected to the synchronous condenser 120 and/or DC motor 129 to control at least some of the operation, e.g., turn off or on, start and/or stop DC motor 129, etc. The control panel may allow an operator to easily turn on or shut off the synchronous condenser 120 and/or DC motor 129. Other control of the synchronous condenser 120 and/or DC motor 129 may be dictated by control component 112 and/or other components of machine-readable instructions 106, described herein. In some implementations, a control panel may comprise and/or include a display, such as a touchscreen display.

Power generating system(s) 130 may represent one or more power generating systems. Power generating system(s) 130 may include one or more of a set of power generators, distribution circuits, and/or other components. By way of non-limiting illustration, power generating system(s) 130 may include one or more of a first power generator 132, a second power generator 134, a third power generator 136, and/or other power generators. An individual power generator may include one or more of a diesel generator, a gas generator, a solar panel, a wind turbine, and/or other components. By way of non-limiting illustration, power generating system(s) 130 may include a set of diesel generators. Individual power generators may include individual electronic control units (ECUs) and/or other components.

In some implementations, power generating system(s) 130 may comprise a microgrid. A microgrid may refer to a relatively small-scale temporary power generation setup that operates independently or in conjunction with the larger electrical power grid. A microgrid may comprise a variety of energy sources (e.g., power generators), such as solar panels, wind turbines, diesel (or gas) generators, Battery Energy Storage Systems (BESS), and/or other sources, along with the necessary infrastructure to distribute and manage electricity.

Microgrids may be deployed in areas prone to outages or remote locations as temporary power generation solutions. A microgrid may function autonomously without relying on the main grid during emergencies or outages. Microgrids are often deployed in emergency situations to provide reliable power when the main electrical grid fails or is unavailable. They are particularly valuable during natural disasters when large portions of the grid might be damaged or down for extended periods. In these situations, microgrids may be especially effective in providing a quick recovery of power and supporting the needs of affected communities.

In FIG. 1, the non-transitory electronic storage 118 may be configured to store information utilized by processor(s) 104, synchronous condenser 120, computing platform(s) 140, and/or other components of system 100. In some implementations, mobile platform 102 may have a dedicated display (not shown in FIG. 1) through which graphical user interface(s) are displayed to allow users to interface directly with processor(s) 104, synchronous condenser 120, DC motor 129, battery bank 119, and/or other components of the system 100.

In some implementations, computing platform(s) 140 may be configured to provide remote hosting of features and/or functions of machine-readable instructions 106 to the portable synchronous condenser apparatus 101. By way of non-limiting illustration, computing platform(s) 140 may include machine-readable instructions which are the same as, or similar to, machine-readable instructions 106. Computing platform(s) 140 may communicate with components of the system 100 via client/server architecture, peer-to-peer communication, and/or other communication schemes. Individual computing platforms may present graphical user interfaces through which users interact with portable synchronous condenser apparatus 101 and/or system 100.

Individual computing platforms may include one or more of a mobile computing platform (e.g., one or more of a cellular telephone, a smartphone, a laptop, a tablet computer, and/or other mobile platforms), a stationary computing platform (e.g., a desktop computer), a remote server, and/or other computing platforms.

In some implementations, portable synchronous condenser apparatus 101 and/or computing platform(s) 140 may include devices configured to present and/or generate content. Content may include visual and/or audio content. By way of non-limiting illustration, portable synchronous condenser apparatus 101 and/or computing platform(s) 140 may include a display configured to present visual content. The visual content may include one or more of individual images, image sequences, video, text, and/or other content. Presentation via a display may be facilitated by a graphics processing unit (GPU) and/or other components incorporated into portable synchronous condenser apparatus 101 and/or computing platform(s) 140. A display may include one or more of a screen, a touchscreen, a monitor, a head-mounted display, a set of screens, and/or other displays.

The non-transitory electronic storage 118 may include storage that is integrally coupled with mobile platform 102, synchronous condenser 120, and/or other components. The non-transitory electronic storage 118 may store information utilized by one or more components of the system 100. By way of non-limiting illustration, the information may include computer program components and/or other information.

The processor(s) 104 may be configured by machine-readable instructions 106. The machine-readable instructions 106 may include one or more computer program components. Executing machine-readable instructions 106 may cause processor(s) 104 to facilitate controlling a portable synchronous condenser apparatus (e.g., portable synchronous condenser apparatus 101) and/or other components. The one or more computer program components may include one or more of a communication component 108, a state component 110, a control component 112, and/or other components.

The communication component 108 (abbreviated "Comm. Component 108" in FIG. 1) may be configured to establish communication channels between the synchronous condenser 120 and one or more power generators in the set of power generators. The synchronous condenser 120 may have communication channels to individual power generators in the set. The synchronous condenser 120 may have communication channels to each individual power generator in the set. In some implementations, establishing a communication channel between the synchronous condenser 120 and an individual power generator may be based on one or more of electrically coupling (e.g., via cable, bus, and/or other components) the synchronous condenser 120 to the individual power generator, establishing a protocol of communication between the synchronous condenser 120 to the individual power generator, and/or other operations. The synchronous condenser 120 may be electrically coupled to the individual power generators so that individual electronic control units (ECUs) of the individual power generators are in communication with the synchronous condenser 120 and/or processor(s) 104.

In some implementations, communication channels may be established through a J1939 protocol and/or other protocol. The J1939 protocol is a communication standard used in the automotive and heavy-duty vehicle industries. It defines how electronic control units (ECUs) in equipment communicate with each other over a Controller Area Network (CAN) bus. The protocol was developed by the Society of Automotive Engineers (SAE) to enable data exchange and control between different systems. The CAN bus may utilize CAN transceivers and/or other components, which are physical devices that convert information from an ECU into electrical signals that can be transmitted on the CAN bus, and vice versa. The CAN bus may include the underlying physical and data link layer protocol, while J1939 may refer to an application layer that defines how information is structured and interpreted on top of CAN.

The communication channels may be established through integration of the synchronous condenser's digital voltage regulator (DVR) as a participant on the J1939 CAN bus of one or more power generators. Once communication is established, reactive load sharing may be accomplished, allowing the synchronous condenser 120 to absorb and/or supply reactance to stabilize the quality of power being delivered to the consumer whilst simultaneously providing fault duty and/or short circuit interruption reliability, described in more detail herein. The synchronous condenser 120 may be paralleled with one or more power generators to facilitate communication of reactance to minimize impact of power fluctuations experienced by one or more of the power generators under dynamic load conditions.

By way of non-limiting illustration, a first communication channel may be established between the synchronous condenser 120 and the first power generator 132 in the set of power generators. By way of non-limiting illustration, a second communication channel may be established between the synchronous condenser 120 and the second power generator 134 in the set of power generators. By way of non-limiting illustration, a third communication channel may be established between the synchronous condenser 120 and the third power generator 136 in the set of power generators.

The control component 112 may be configured to cause the DC motor 129 to activate (e.g., power on) based on power supplied to the DC motor 129 by the battery bank 119. Activation of the DC motor 129 may cause initial and/or ongoing (over a period of time) rotation of the rotor 124 of the synchronous condenser 120. Activation may be accomplished by controlling a motor control circuit (e.g., microcontroller and/or other logic circuits) of the DC motor 129 to apply a voltage (and/or current) across motor terminals.

The control component 112 may be configured to detect whether the rotor 124 of the synchronous condenser 120 is at and/or near an operating speed. The detections may be based on a sampling rate of rotational speed of the rotor 124 and/or DC motor 129 (e.g., its output shaft). The sampling rate may be one or more of intermittent (e.g., every second), ongoing (e.g., continuous, continuous over a period of time, and/or other considerations), quasi-continuous, and/or other considerations. The synchronous condenser 120 may include a speed sensor (not shown in FIG. 1). A Static Frequency Converter (SFC) may be used to regulate the speed of the synchronous condenser 120, during startup and/or when adjusting excitation. The speed sensor may provide an electrical signal carrying speed information (e.g., rotational speed of rotor 124, rotor position information, etc.) to processor(s) 104.

The control component 112 may be configured to, in response to detecting the rotor 124 is at the operating speed, deactivate the DC motor 129 (e.g., power off). The operating speed may be determined by a frequency of the electrical power system it's connected to. By way of non-limiting illustration, for a 60 Hz system, this may translate to a synchronous speed of 1800 rpm if the synchronous condenser has 4 poles.

The control component 112 may be configured to cause a charging of the battery bank 129 by the power generating system(s) 130 and/or other power source. Charging may be controlled and/or monitored by one or more of a Battery Management System (BMS), one or more battery chargers, and/or other components. One or more battery chargers may be configured to direct a flow of electricity to one or more batteries of battery bank 129. The control component 112 may be configured to cause one or more battery chargers to direct an amount of power obtained from power generating system(s) to one or more batteries. The amount of the electrical energy used to charge one or more batteries may comprise a battery input power (and/or energy). The battery input power (and/or energy) may comprise the electrical energy that charges the one or more batteries, either to a complete charge or other charged state.

In some implementations, control component 112 may be configured to determine the battery input power (and/or energy) based on a current state of charge of one or more batteries in battery bank 119. By way of non-limiting illustration, a current state of charge of the one or more batteries may be measured through a battery monitoring system (not shown in FIG. 1). One or more of voltage, amperage, and/or ampere hours remaining may be measured through a battery monitoring system (BMS) and/or apparatus suitable for the intended purpose. The battery monitoring system may be integrally coupled to the mobile platform 102. The BMS may prevent operation outside the one or more batteries safe operating condition(s). By way of non-limiting illustration, a BMS may include one or more of an internal switch (such as a relay and/or solid state device) which is opened if a battery is operated outside its safe operating area, ability to request DC motor 129 to which a battery is connected to reduce or even terminate using the battery, ability to actively control the environment (e.g., such as through heaters, fans, air conditioning or liquid cooling), and/or other features and/or functionality.

The state component 110 may be configured to obtain, through the communication channels, operation information of power generators of power generating system(s) 130, and/or other information. The operation information may include operating parameter values of operating parameters of one or more of the power generators, and/or other information. The operating parameter values may characterize state of power generation by individual power generators and/or other information. State of power generation by individual power generators may be characterized at individual points in time and/or over time. The operation information may characterize state of power generation by the power generators, which may be indicative of reactive power requirements of the power generators (e.g., state of surplus or deficit) and/or other measures.

The operating parameters may include one or more of a power factor parameter, excitation parameter, a voltage parameter, a reactive power parameter, a load parameter, and/or other parameters.

Operating parameter values of a power factor parameter may indicate power factor, which itself is an indicator of whether a generator is supplying (e.g., in a state of reactive power surplus) or absorbing reactive power (e.g., in a state of reactive power deficit). Power factor is a ratio of real power (active power) to apparent power in the system. If the power factor is "leading" (the current leads the voltage), a generator may have a reactive power surplus. This can happen if there is a capacitive load because capacitive loads store energy in electric fields when voltage is applied, causing the current to lead the voltage. If the power factor is "lagging" (the current lags behind the voltage), a generator may have a deficiency of reactive power. This typically occurs when the load is inductive, because inductive loads store energy in magnetic fields when current flows through them, causing the current to lag behind the voltage.

Operating parameter values of an excitation parameter may indicate excitation current in an alternator. The excitation current may determine a strength of a magnetic field it generates. Operating parameter values of an excitation parameter may indicate increases and/or decreases in excitation current. If the excitation current is increased, the generator is more likely to supply reactive power. This is because higher excitation increases the generator's voltage output, which increases the reactive power supplied. If the excitation is decreased, a generator is more likely to absorb reactive power (or "dump" less), as the voltage output drops.

Operating parameter values of a voltage parameter may indicate terminal voltage of a generator. The terminal voltage may be directly related to reactive power. By way of non-limiting illustration, if the terminal voltage is higher than expected for load conditions, the generator may be experiencing excess reactive power (this is typical in systems with capacitive loads). If the terminal voltage is lower than expected, it may indicate that the generator is absorbing reactive power (e.g., in a state of deficit reactive power) to help support the system, typically in a situation where the load is inductive.

Operating parameter values of a reactive power parameter may indicate reactive power output. Reactive power output may be expressed in kVAR (kilovolt-amperes reactive). If a generator is supplying reactive power, the kVAR output will be positive. If a generator is absorbing reactive power, the kVAR output will be negative.

Operating parameter values of a load parameter may characterize load. Load may be characterized as one or more of inductive, capacitive, and/or other characteristics. If a generator is connected to an inductive load, the generator may supply reactive power. If a generator is connected to a capacitive load, the generator may need to absorb reactive power. By way of non-limiting illustration, diesel generators may produce reactive power to balance inductive loads. Diesel generators may also absorb reactive power if the load is capacitive.

By way of non-limiting illustration, the operation information may include one or more of a first set of operating parameter values for the first power generator 132, a second set of operating parameter values for the second power generator 134, a third set of operating parameter values for the third power generator 136, and/or other information.

The control component 112 may be configured to control an operation of the synchronous condenser 120 in response to rotor 124 being at operating speed. The control component 112 may be configured to control an operation of the synchronous condenser 120 based on the operation information and/or other information. Control may be effectuated through generation and/or communication of control signals carrying information instructing operation. In some implementations, operation of the synchronous condenser 120 may include absorbing and/or supplying reactive power. In some implementations, operation of the synchronous condenser 120 may include absorbing and/or supplying reactive power to power generating system(s) 130. In some implementations, operation of the synchronous condenser 120 may include absorbing and/or supplying reactive power to individual power generators of power generating system(s) 130. The operation of the synchronous condenser 120 may be controlled to absorb and/or supply reactive power to individual power generators based on the operation information of the individual power generators. The operation of the synchronous condenser 120 may be controlled to absorb and/or supply reactive power to multiple power generators concurrently, based on the operation information of individual power generators. The operation of the synchronous condenser 120 may be controlled to absorb reactive power from power generators when the power generators are in a state of reactive power surplus. The operation of the synchronous condenser 120 may be controlled to supply reactive power to power generators when the power generators are in a state of reactive power deficit.

By way of non-limiting illustration, the operation of the synchronous condenser 120 may be controlled based on one or more of the first set of operating parameter values, the second set of operating parameter values, and/or other information. By way of non-limiting illustration, the synchronous condenser 120 may be controlled to absorb and/or supply reactive power to the first power generator 132 based on the first set of operating parameter values and/or other information. By way of non-limiting illustration, the synchronous condenser 120 may be controlled to absorb and/or supply reactive power to the second power generator 134 based on the second set of operating parameter values and/or other information. By way of non-limiting illustration, the synchronous condenser 120 may be controlled to absorb and/or supply reactive power to the third power generator

136 based on the third set of operating parameter values and/or other information. By way of non-limiting illustration, the synchronous condenser 120 may be controlled to absorb and/or supply reactive power to the first power generator 134 based on the first set of operating parameter values while being controlled to concurrently absorb and/or supply reactive power to the second power generator 134 based on the second set of operating parameter values and/or other power generator(s).

By way of non-limiting illustration, based on operating parameter values indicating a power generator is supplying excess/surplus reactive power, synchronous condenser 120 may be controlled to absorb the reactive power. By way of non-limiting illustration, based on operating parameter values indicating a power generator is in a state of reactive power deficit, synchronous condenser 120 may be controlled to supply reactive power of the power generator. By way of non-limiting illustration, if a power factor is "leading," a generator may have a reactive power surplus, and synchronous condenser 120 may be controlled to absorb reactive power from the generator to balance the power factor as close to unity as possible. By way of non-limiting illustration, if a power factor is "lagging," a generator may be in a state of reactive power deficit, and synchronous condenser 120 may be controlled to supply reactive power to balance the power factor as close to unity as possible.

One or more advantages of the features and/or functions disclosed herein with respect to utilizing a synchronous condenser in a temporary power generation setup is the fault duty contribution it may provide. Fault duty may refer to a maximum level of electrical current that equipment (e.g., circuit breakers, transformers, generators, and/or other devices) is expected to withstand or interrupt during a fault condition, such as a short circuit, without being damaged. In accordance with one or more implementations presented herein, a synchronous condenser may contribute to the fault duty, meaning the synchronous condenser may play a role in the total fault current that flows through a circuit when a fault occurs. This contribution may refer to the amount of current that the synchronous condenser can potentially supply to the fault current during the event.

By way of non-limiting illustration, the rotating mass of a synchronous condenser cannot be stopped in a split second, or a matter of seconds, because of the rotating momentum. This serves many purposes. One purpose is that the number of power generators the power generation system setup can be reduced as the synchronous condenser itself may provide the rotating mass equivalent to a power generator (e.g., diesel generator). Another purpose is that the synchronous condenser may emulate characteristics of a power generator in the event of a line fault. However, unlike a power generator and/or inverter-derived power source, the synchronous condenser may "push through" (e.g., continue to provide power through) the fault in relatively more cycles.

By way of non-limiting illustration, should a distribution circuit be powered by a temporary generation setup and utilizing a synchronous condenser have a fault occur (e.g., a tree falls across the distribution lines), automatic line reclosers (e.g., a type of circuit breaker designed to automatically detect faults and attempt to restore service by briefly closing the circuit after a fault occurs) may open, then close, then reopen if the fault is still on the line, without disrupting the generation capabilities of the temporary generation setup. That is, the temporary generation setup may continue to provide power and push through such a fault by virtue of the synchronous condenser as designed and arranged herein.

Figure 4:
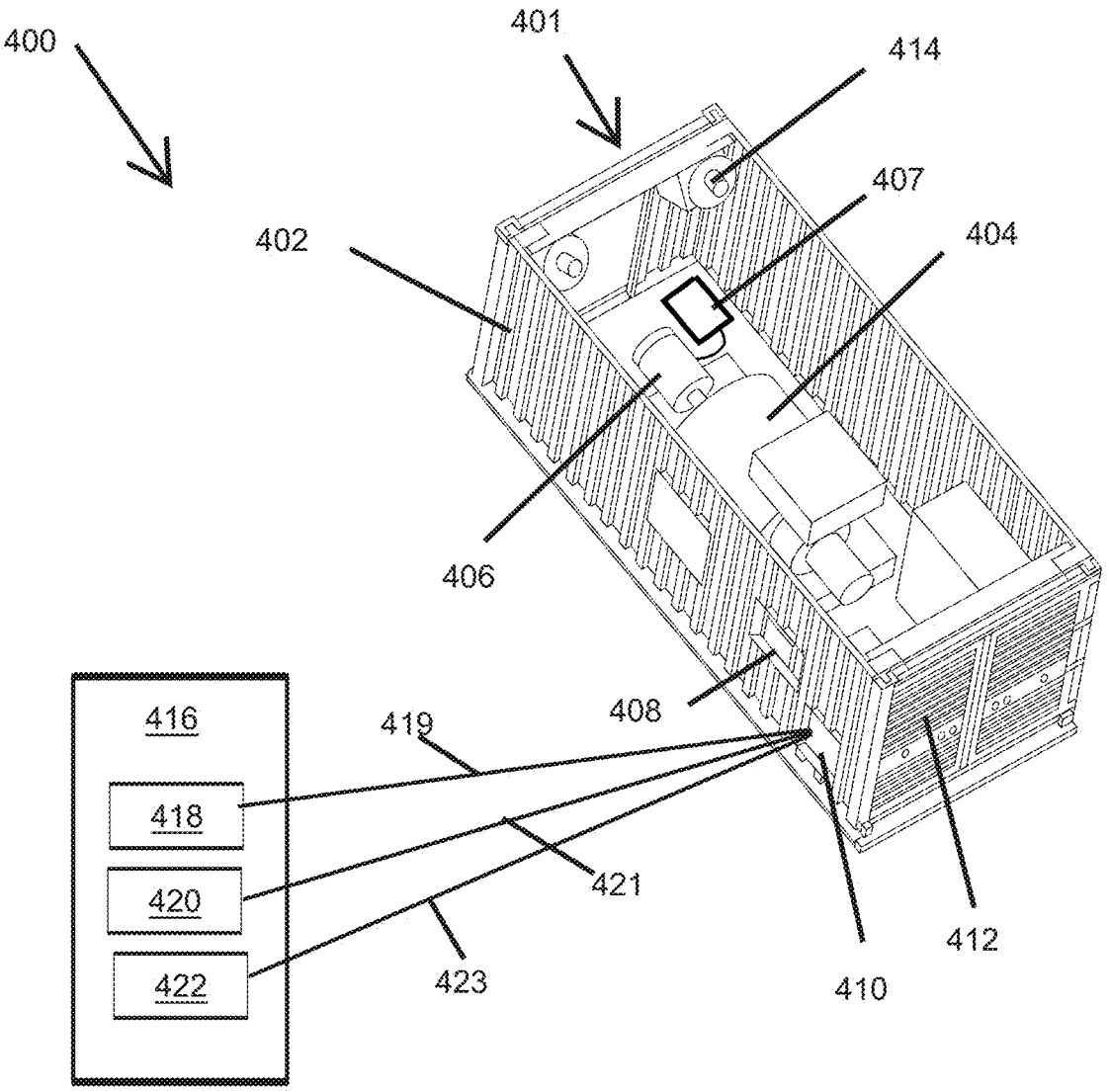
FIG. 4 illustrates a portable synchronous condenser system, in accordance with one or more implementations.

FIG. 4 illustrates a portable synchronous condenser system 400, in accordance with one or more implementations. The portable synchronous condenser system 400 may be the same as or similar to portable synchronous condenser system 100 shown and described with respect to FIG. 1. By way of non-limiting illustration, system 400 may include one or more of a portable synchronous condenser apparatus 401, power generating system 416, and/or other components.

The portable synchronous condenser apparatus 401 may be a self-contained machine including one or more of a mobile platform 402 (e.g., container), a synchronous condenser 404, a DC motor 406, a battery bank 407, control panel 408, power panel 410, air inlet louver vent(s) 412, ventilation cooling fan(s) 414, processor(s) (not shown in FIG. 4), electronic storage (not shown in FIG. 4), and/or other components. Mobile platform 402 is shown with a roof omitted for illustrative purposes, although in implementation the roof may be present. One or more components may be preassembled and/or preinstalled so that portable synchronous condenser apparatus 401 may be easily connected to an electrical power network, including power generating system 416.

The synchronous condenser 404 may be positioned within mobile platform 402 that provides an operating environment for synchronous condenser 404 and/or other components. The synchronous condenser 404 may be mounted onto a floor of mobile platform 402. Ventilation cooling fan(s) 414 may be controlled to vent heat generated by synchronous condenser 404.

The power panel 410 may be mounted on an exterior surface of mobile platform 402, and may include one or more connectors for exterior electrical cable connections. The control panel 408 may be mounted on the side of mobile platform 402. The control panel 408 may be electrically connected to the synchronous condenser 404 to control at least some of its operation.

Power generating system 416 may include a set of power generators and/or other components. By way of non-limiting illustration, power generating system 416 may include one or more of a first power generator 418, a second power generator 420, a third power generator 422, and/or other power generators. An individual power generator may include, for example, a diesel generator. Individual power generators may include individual electronic control units (ECUs) and/or other components.

Portable synchronous condenser apparatus 101 may include a set of electrical coupling (e.g., cables) to couple the power generators in the power generating system 416. By way of non-limiting illustration, a first coupling 419 may couple portable synchronous condenser apparatus 101 to the first power generator 418, a second coupling 421 may couple portable synchronous condenser apparatus 101 to the second power generator 420, and/or a third coupling 423 may couple portable synchronous condenser apparatus 101 to the third power generator 422. Although three power generators and three couplings are shown, this is for illustrative purposes only. Instead, those skilled in the art may recognize that the quantity of power generators and associated couplings may be fewer or more than shown. Through the couplings and/or other connections, communication channels between the synchronous condenser 404 and one or more power generators may be established, in accordance with one or more features and/or functions presented herein.

Returning to FIG. 1, mobile platform 102, computing platform(s) 140, external resource(s) 150, power generating system(s) 130, and/or other components may be operatively linked via one or more electronic communication links. For example, such electronic communication links may be established, at least in part, via one or more networks 160. One or more networks 160 may include wireless networks (e.g., Internet, Bluetooth, etc.), wired networks (e.g., cables, wires, etc.), and/or other networks. It will be appreciated that this is not intended to be limiting and that the scope of this disclosure includes implementations in which components of system 100 may be operatively linked via some other communication media.

External resource(s) 150 may include sources of information, hosts, and/or providers of information outside of system 100, external entities participating with system 100, and/or other resources. In some implementations, some or all of the functionality attributed herein to external resource(s) 150 may be provided by resources included in system 100. By way of non-limiting illustration, external entities may include one or more of known infrastructure, a distribution circuit, and/or other components.

Processor(s) 104 may include communication lines or ports to enable the exchange of information with one or more of network(s) 160, power generating system(s) 130, computing platform(s) 140, synchronous condenser 120, and/or other components. The illustration of processor(s) 104 in FIG. 1 is not intended to be limiting. Processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 118 may include electronic storage media that electronically stores information. The electronic storage media of electronic storage 118 may include one or both of system storage that is provided integrally (i.e., substantially non-removable) with mobile platform 102 and/ or synchronous condenser 120, and/or removable storage that is removably connectable to mobile platform 102 and/or synchronous condenser 120 via, for example, a port or a drive. A port may include a USB port, a firewire port, and/or other ports. A drive may include a disk drive and/or other drives. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 140, synchronous condenser 120, and/or power generating system(s) 130, and/or other information that enables system 100 to function as described herein.

Processor(s) 104 may be configured to provide information-processing capabilities in portable synchronous condenser apparatus 101. As such, processor(s) 104 may include one or more of a digital processor, physical processor(s), an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, and/or 112. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components or from portable synchronous condenser apparatus 101. While computer program components are described herein as being implemented via processor(s) 104 through machine-readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or other components. As another example, processor(s) 104 may be configured to execute one or more additional components that may perform some or all of the functionality attributed to one of components 108, 110, and/or 112.

Figure 2:
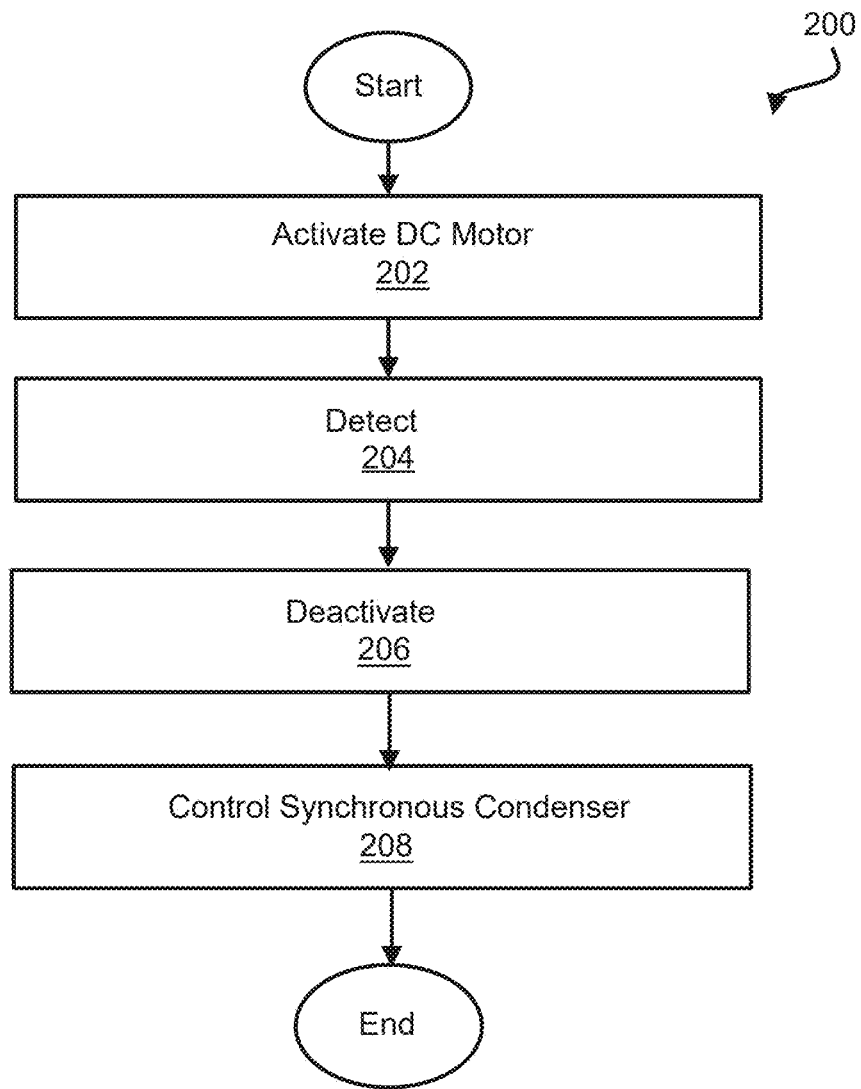
FIG. 2 illustrates a method to control a synchronous condenser utilizing a DC motor, in accordance with one or more implementations.

FIG. 2 illustrates a method 200 to control a portable synchronous condenser apparatus, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a physical processor, a digital processor, an analog processor, a digital circuit designed to process information, an analog circuit designed to process information, a state machine, and/or other mechanisms for electronically processing information), storage media storing machine-readable instructions, a synchronous condenser, a DC motor, a battery bank, external resource(s), a set of power generators, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, the DC motor may be activated. The DC motor may be activated based on power supplied by the battery bank. Activation of the DC motor may cause initial rotation of a rotor of the synchronous condenser. In some implementations, operation 202 may be performed by one or more processors executing a computer program component the same as or similar to control component 112 (shown in FIG. 1 and described herein).

At an operation 204, a rotating speed of the rotor may be monitored to detect whether the rotor is at an operating speed. In some implementations, operation 204 may be performed by one or more processors executing a computer program component the same as or similar to control component 112 (shown in FIG. 1 and described herein).

At an operation 206, in response to detecting the rotor is at the operating speed, the DC motor may be deactivated. In some implementations, operation 206 may be performed by one or more processors executing a computer program component the same as or similar to control component 112 (shown in FIG. 1 and described herein).

At an operation 208, an operation of the synchronous condenser may be controlled based on operation of a set of power generators. In some implementations, operation 208 may be performed by one or more processors executing a computer program component the same as or similar to control component 112 (shown in FIG. 1 and described herein).

Figure 3:
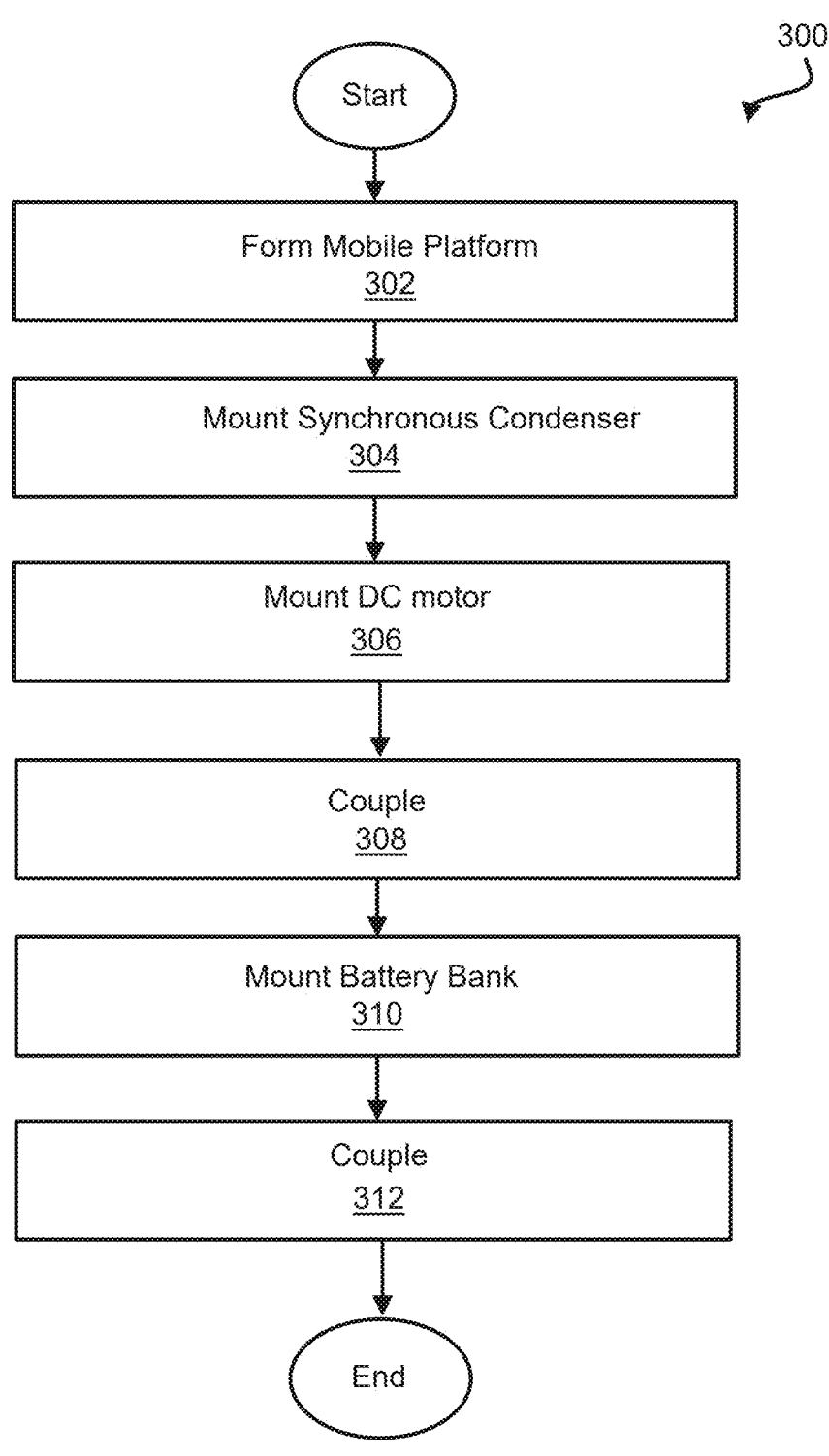
FIG. 3 illustrates a method of manufacture of a portable synchronous condenser apparatus, in accordance with one or more implementations.

FIG. 3 illustrates a method 300 of manufacture of a portable synchronous condenser apparatus, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented using one or more manual and/or automated manufacturing techniques. A manual manufacturing techniques may include one or more mounting techniques used by skilled artisans in vehicle manufacture, heavy equipment manufacture, load bank manufacture, commercial electricians, and/or other persons of skill in the art. A mounting technique may include one or more of welding, riveting, screwing, bolting, adhering, electrically coupling, and/or other techniques. Other techniques known to skilled artisans are also within the scope of the present disclosure. An automated manufacturing technique may include machines and one or more processing devices. The one or more processing devices and/or machines may include one or more devices executing some or all of the operations of method 300 in response to instructions stored electronically on an electronic storage medium. The one or more processing devices and/or machines may include one or more devices configured through hardware, firmware, and/or software to be specifically designed for execution of one or more of the operations of method 300.

At an operation 302, a mobile platform may be formed and/or adapted to carry one or more of a synchronous condenser, a DC motor, a battery bank, and/or other components.

At an operation 304, a synchronous condenser may be mounted on the mobile platform.

At an operation 306, a DC motor may be mounted on the mobile platform.

At an operation 308, the DC motor may be mechanically coupled to a rotor of the synchronous condenser.

At an operation 310, a battery bank may be mounted on the mobile platform.

At an operation 312, the battery bank may be electrically coupled to the DC motor and configured to supply power to the direct current motor.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A portable synchronous condenser system comprising:
a mobile platform;
a synchronous condenser, the synchronous condenser being carried by the mobile platform, the synchronous condenser being electrically coupled to a power generating system including a set of power generators;
a direct current motor mechanically coupled to a rotor of the synchronous condenser and configured to rotate the rotor to an operating speed, the direct current motor being carried by the mobile platform;
a battery bank electrically coupled to the direct current motor and configured to supply power to the direct current motor, the battery bank being carried by the mobile platform; and
one or more physical processors configured by machine-readable instructions to:
    cause the direct current motor to activate based on the power supplied by the battery bank, activation of the direct current motor causing initial rotation of the rotor;
    detect whether the rotor is at the operating speed;
    in response to detecting the rotor is at the operating speed, deactivate the direct current motor;
    establish communication channels between the synchronous condenser and one or more power generators in the set of power generators, such that a first communication channel is established between the synchronous condenser and a first power generator in the set of power generators, and a second communication channel is established between the synchronous condenser and a second power generator in the set of power generators;
    obtain, through the communication channels, operation information of the power generators, the operation information including operating parameter values of operating parameters of the power generators, the operating parameter values characterizing operation of the set of power generators based on state of power generation by the power generators over time, the operation information including a first set of operating parameter values for the first power generator, and a second set of operating parameter values for the second power generator; and
    control an operation of the synchronous condenser based on the operation of the set of power generators, including controlling the operation of the synchronous condenser based on the operation information.

2. The portable synchronous condenser system of claim 1, wherein the one or more physical processors are further configured by the machine-readable instructions to:

cause a charging of the battery bank by the power generating system.

3. The portable synchronous condenser system of claim 1, wherein the communication channels are established through a J1939 protocol.

4. The portable synchronous condenser system of claim 1, wherein the operation of the synchronous condenser includes absorbing and/or supplying reactive power.

5. The portable synchronous condenser system of claim 1, wherein an individual power generator includes a diesel generator.

6. The portable synchronous condenser system of claim 1, wherein detection of whether the rotor is at the operating speed is based on sampling of a speed of the rotor.

7. The portable synchronous condenser system of claim 6, wherein the synchronous condenser provides a fault duty contribution by virtue of a rotating mass of the synchronous condenser.

8. A portable synchronous condenser apparatus comprising:

a synchronous condenser;

a direct current motor mechanically coupled to a rotor of the synchronous condenser and configured to rotate the rotor to an operating speed;

a battery bank electrically coupled to the direct current motor and configured to supply power to the direct current motor; and one or more physical processors configured by machine-readable instructions to:

cause the direct current motor to activate based on the power supplied by the battery bank, activation of the direct current motor causing initial rotation of the rotor;

detect whether the rotor is at the operating speed;

in response to detecting the rotor is at the operating speed, deactivate the direct current motor;

establish communication channels between the synchronous condenser and one or more power generators in a set of power generators, such that a first communication channel is established between the synchronous condenser and a first power generator in the set of power generators, and a second communication channel is established between the synchronous condenser and a second power generator in the set of power generators;

obtain, through the communication channels, operation information of the power generators, the operation information including operating parameter values of operating parameters of the power generators, the operating parameter values characterizing operation of the set of power generators based on state of power generation by the power generators over time, the operation information including a first set of operating parameter values for the first power generator, and a second set of operating parameter values for the second power generator; and control an operation of the synchronous condenser, including controlling the operation of the synchronous condenser based on the operation information.

9. The portable synchronous condenser apparatus of claim 8, wherein the communication channels are established through a J1939 protocol.

10. The portable synchronous condenser apparatus of claim 8, wherein an individual power generator includes a diesel generator, a solar panel, or a wind turbine.

11. The portable synchronous condenser apparatus of claim 8, further comprising a mobile platform carrying the synchronous condenser, the direct current motor, and the battery bank.

12. The portable synchronous condenser apparatus of claim 11, wherein the mobile platform includes a container.

13. The portable synchronous condenser apparatus of claim 8, wherein the operation of the synchronous condenser includes absorbing and/or supplying reactive power.

14. The portable synchronous condenser apparatus of claim 8, wherein the one or more physical processors are further configured by the machine-readable instructions to:

cause a charging of the battery bank.

15. A synchronous condenser system comprising:

a set of diesel generators configured to supply power;

a synchronous condenser, the synchronous condenser being electrically coupled to the set of diesel generators;

a direct current motor mechanically coupled to a rotor of the synchronous condenser and configured to rotate the rotor to an operating speed;

a battery bank electrically coupled to the direct current motor and configured to supply power to the direct current motor; and one or more physical processors configured by machine-readable instructions to:

cause the direct current motor to activate based on the power supplied by the battery bank, activation of the direct current motor causing initial rotation of the rotor;

detect whether the rotor is at the operating speed;

in response to detecting the rotor is at the operating speed, deactivate the direct current motor;

establish communication channels between the synchronous condenser and one or more diesel generators in the set of diesel generators, such that a first communication channel is established between the synchronous condenser and a first diesel generator in the set of diesel generators, and a second communication channel is established between the synchronous condenser and a second diesel generator in the set of diesel generators;

obtain, through the communication channels, operation information of the diesel generators, the operation information including operating parameter values of operating parameters of the diesel generators, the operating parameter values characterizing operation of the set of diesel generators based on state of power generation by the diesel generators over time, the operation information including a first set of operating parameter values for the first diesel generator, and a second set of operating parameter values for the second diesel generator; and control an operation of the synchronous condenser based on the operation of the set of diesel generators, including controlling the operation of the synchronous condenser based on the operation information.

16. The synchronous condenser system of claim 15, wherein the one or more physical processors are further configured by the machine-readable instructions to:

cause a charging of the battery bank by the power supplied by the set of diesel generators.

17. The synchronous condenser system of claim 15, wherein the communication channels are established through a J1939 protocol.

18. The synchronous condenser system of claim 15, further comprising a mobile platform carrying the synchronous condenser, the direct current motor, and the battery bank.

19. The synchronous condenser system of claim 18, wherein the mobile platform includes a container.

20. The synchronous condenser system of claim 15, wherein the operation of the synchronous condenser includes absorbing and/or supplying reactive power.

\* \* \* \* \*